Figure 2:
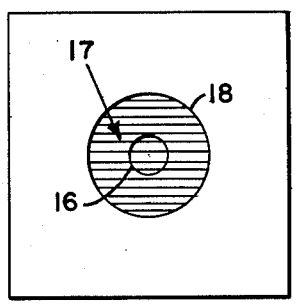

April 21, 1964    D. TATUM ETAL    3,129,589
PRESSURE RESPONSIVE INSTRUMENT
Filed April 1, 1960

INVENTOR.
DAVID TATUM
BY MARTIN S. MALTENFORT

Robertson & Smythe
ATTORNEYS

United States Patent Office 3,129,589
Patented Apr. 21, 1964

3,129,589
PRESSURE RESPONSIVE INSTRUMENT
David Tatum, Bala-Cynwyd, and Martin S. Maltenfort, Upper Darby, Pa., assignors to Ametek, Inc., New York, N.Y., a corporation of Delaware
Filed Apr. 1, 1960, Ser. No. 19,382
4 Claims. (Cl. 73—398)

The present invention relates to sensitive pressure responsive instruments, and particularly to such an instrument and method that will operate in response to very small changes in pressure, in the order of about $\frac{1}{100}$ of one percent change in ambient pressure, and still be independent of acceleration, shock or vibration effects.

In the missile field, it has been found necessary to operate certain electrical circuits at precise altitudes, particularly during the descent of the missile. Such circuits are employed to bring into effect certain operations as the missile re-enters the atmosphere.

One of the objects of this invention is to provide a sensitive pressure responsive instrument in which slight variations of ambient pressure will provide a signal.

Another object of the invention is to provide such an instrument which relies for operation upon the principle that certain substances which are maintained at a substantially constant temperature pass through a change of state at a specific pressure. That is, they change from a solid to a liquid, a liquid to a vapor, or a solid to a vapor.

Another object of the invention is to provide such an instrument in which the change of state of the substance affects an electric circuit to produce a signal or other response.

Another object of the invention is to provide such an instrument in which the substance, the change of state of which is utilized to provide a signal, is supported by or contained within means having substantially a zero spring rate so as not to impair the sensitivity of the apparatus.

Another object of the invention is to provide such an instrument in which the substance, the change of state of which is to be utilized, is contained within a freely expanding mass having substantially no resistance to expansion.

In one aspect of the invention, a chamber may be provided with an orifice leading to the atmosphere. The chamber may be provided with a suitable heating shell that may have a resistance wire embedded within it to supply heat to the chamber. Other means of heating may be used.

In another aspect of the invention, the wires of the heating shell may form a grid or other form of low pneumatic friction loss structure over the orifice so that heat will be supplied to the passage of any air into the chamber; and heat insulating baffles may be located between a portion of the interior of the chamber and said orifice which will inhibit ambient temperature variations affecting said portion of the chamber.

In another aspect of the invention, sensitive temperature responsive means may be contained within the chamber which may control a heat balancing circuit that supplies power to the resistance wires within the heating shell of the chamber or to the heating means for the chamber. The entire chamber, excluding the orifice, may then be covered with suitable insulating material. The chamber temperature should be maintained at a temperature some point above the ambient temperature so that condensation or reverse of change of state will occur when the ambient pressure increases. The flow of heat should be such that there is a heat loss from the chamber, for otherwise the temperature could rise in the chamber which is not desirable.

In another aspect of the invention, a freely expanding elastomer including the substance, the change of state of which is to be utilized, may be located within the chamber and may be arranged so that upon the substance changing from one state into another, suitable electrical circuits may be affected or actuated either directly, or indirectly using capacitative or inductive couplings.

In still another aspect of the invention, the continuous phase may be any one or a combination of suitable polymers which may be cured, cooled or by other means formed into a hardened or solidified body of an acceptably low durometer reading, while the discontinuous phase may be small spheres (1.0 micron or less in diameter) of a suitable fluid, the change of condition of which affects total volume.

In still another aspect of the invention, the elastomeric bodies may be interposed between conductive plates or sheets, the plates being capacitatively connected into an electric circuit. Change of dimension of the elastomeric bodies will affect the circuit to provide a signal. The elastomeric bodies may be of the same material or may be of selected material responsive to various pressures.

The above, other objects and novel features of the invention will become apparent from the following specification and accompanying drawing which is merely exemplary.

Figure 1:
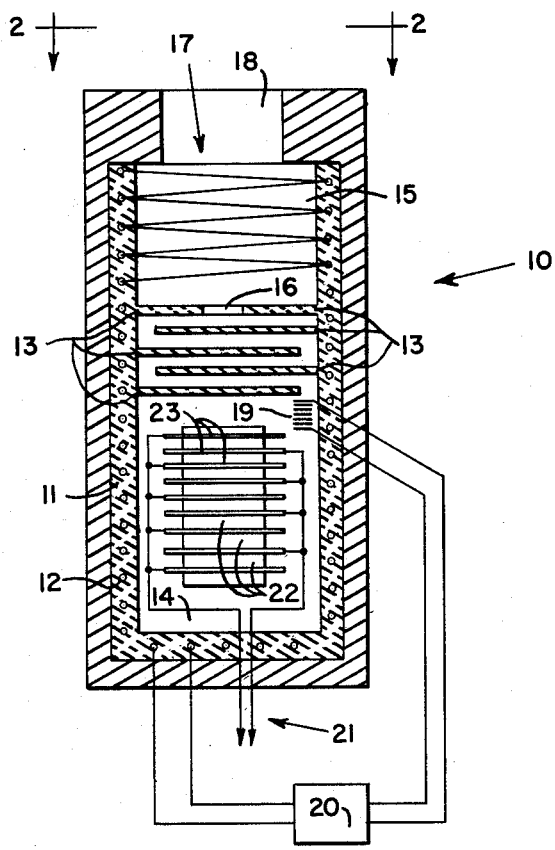

In the drawing:

FIG. 1 is a longitudinal cross sectional view of an apparatus to which the principles of the invention have been applied, and FIG. 2 is a view looking in the direction of the arrows along line 2—2 of FIG. 1.

Referring to the drawing, the principles of the invention are shown as applied to a chamber including a heating shell 11 which may be made from refractory material or the like, and having embedded therein electrical resistance heating elements 12.

Thermal baffles 13 may divide the chamber 10 formed by the shell 11 into two compartments 14 and 15. The baffles 13 may provide an orifice 16 and a tortuous path leading to the compartment 14 so that changes in outside ambient pressure will be readily transferred to the compartment 14 and heat therein will not readily pass through said orifice.

The heating elements 12 may form one or more grids or screens 17, or other forms of pneumatically low friction flow means leading from the outside to the orifice 16 for the purpose of preheating any air that passes through the orifice 16 to chamber 14. The entire shell 11, except an opening 18, may be covered with suitable insulating material to ensure minimum heat loss to the outside atmosphere. The primary purpose of preheating the air by means of heating elements 12 and grid 17 is to balance said heat loss.

In order to maintain the temperature substantially constant within the compartment 14 and above the ambient, a temperature responsive element 19, such as a thermopile or the like, may be located therein for controlling a heat balancing circuit 20, such circuits being well known. The heat balancing circuit may control the power to heating elements 12 and 17 to maintain the temperature within compartment 14 at a predetermined temperature, i.e., within about ±0.3° C.

The substance, the change of state of which is to be utilized, may be one that changes from a liquid to a vapor. So long as there is no increase in pressure resulting from the emanation of the vapor, the liquid will continue to vaporize, thus substantially and rapidly increasing the volume of the container or containers therefor. In order to confine the vapor without increasing the pressure, the liquid may be emulsified into a polymer that is subsequently capable by curing, cooling or other means of being hardened or solidified to a relatively low durometer reading. Consequently, each tiny cell of the liquid that is minutely dispersed within the polymer will suddenly and rapidly expand upon reaching the change-of-state pressure point. This will have the effect of increasing the volume of the continuous or the elastomeric phase, and such an increase in dimension may be used to provide a signal in the electric circuit 21 either directly, or indirectly using capacitative or other impedance couplings as described hereinafter.

As an example, the elastomeric continuous phase may be a polymer or composition such as synthetic liquid polysulphide rubber containing suitable plasticizers, catalysts or cross-linking agents, said mixture being subsequently cured to an acceptably low durometer reading in the order of about 2 to 10 durometer Shore A hardness. The discontinuous phase of the body may be small spheres (1.0 micron or less in diameter) of a suitable liquid incompatible with the continuous phase such as water-low molecular weight alcohol solution.

The percentage of discontinuous phase may be approximately 30–60 percent by volume. The discontinuous phase will be immiscible and is dispersed through the continuous phase prior to curing the selected polymer, and will neither solvate nor react with the polymer. In some instances, it may be desirable to add some surface active agent which will promote the formation of a water-in-oil emulsion.

As another example, a thermoplastic elastomer comprising a mixture of animal glue, glycerine or other glycol and water is melted and carbon tetrachloride dispersed therein. The mixture then is cooled to solidify forming the continuous phase.

Laminations 22 made from the elastomeric body may be suitably supported within the compartment 14. In the form shown in FIG. 1, a plurality of bodies 22 are separated by electrically conductive plates 23. Plates 23 may be connected in an electrical condenser configuration to circuit 21. Thus, changes in volume of bodies 22 displace plates 23 relative to each other and change the signal in circuit 21. Such can be used to operate a measuring instrument such as a recorder or can be used in a control circuit.

If desired, the elastomeric bodies 22 may be of different selected materials so that they respond to various pressures at different locations within the plate and elastomeric body assembly. In this base, circuit 21 can be arranged to be responsive to the various pressure differential signals so as to give a broad range of sensitivity.

From the foregoing it is evident that by properly adjusting the heat balancing circuit including the unit 20, a constant temperature can be maintained within the compartment 14, and as the ambient pressure on the outside of the chamber reaches the boiling pressure of the discontinuous phase of the elastomeric body forming laminations 22, the heat of vaporization or heat of fusion of the discontinuous phase will be supplied by the heating elements 12, causing the discontinuous phase to change its state. Accordingly, the discontinuous phase of the elastomeric body will vaporize or liquefy, causing rapid expansion of the continuous phase thereby to actuate the responsive circuit or means.

Although the various features of the new and improved switch means has been disclosed and described in detail to fully disclose one embodiment of the invention, it will be evident that changes may be made in such details and certain features may be used without others without departing from the principles of the invention.

What is claimed is:

1. Apparatus comprising in combination, a chamber; an orifice leading to said chamber; a heating shell surrounding said chamber and adapted to supply heat to said chamber; insulation surrounding said shell; temperature sensitive means within said chamber; a heat balancing circuit controlled by said temperature sensitive means for supplying power to said heating shell to maintain said chamber at substantially a constant temperature; a mass including an elastomeric body comprising a polymer and a fluid within said chamber; and contacts adapted to be actuated by the variation in volume of said elastomeric body due to the ambient pressure reaching the boiling pressure of said fluid.

2. Apparatus comprising in combination, a chamber; an orifice leading to said chamber; a heating shell surrounding said chamber and adapted to supply heat to said chamber; insulation surrounding said shell; temperature sensitive means within said chamber; a heat balancing circuit controlled by said temperature sensitive means for supplying power to said heating shell to maintain said chamber at substantially a constant temperature; a body including laminations made from an elastomeric body including a polymer of relatively low durometer reading as the continuous phase, and a substance capable of changing its physical state at a specific ambient pressure and temperature as the discontinuous phase; and an electrical impedance circuit means adapted to be actuated by the variation in volume of said laminae due to the ambient pressure reaching the point at which said discontinuous phase changes state.

3. Apparatus comprising in combination, a chamber; an orifice leading to said chamber; a heating shell surrounding said chamber and adapted to supply heat to said chamber; insulation surrounding said shell; temperature sensitive means within said chamber; a heat balancing circuit controlled by said temperature sensitive means for supplying power to said heating shell to maintain said chamber at substantially a constant temperature; a low friction heating element covering said orifice; a mass including an elastomeric body of a polymer and a fluid within said chamber; and an electrical circuit adapted to be actuated by the variation in volume of said elastomeric body due to the ambient pressure reaching the boiling pressure of said fluid.

4. Apparatus comprising in combination a chamber; an orifice leading to said chamber; a heating shell surrounding said chamber and adapted to supply heat to said chamber; insulation surrounding said shell; temperature sensitive means within said chamber; a heat balancing circuit controlled by said temperature sensitive means for supplying power to said heating shell to maintain said chamber at substantially a constant temperature; thermal isolation baffle means between said orifice and chamber; a low friction heating element covering said orifice; a mass including an elastomeric body of a polymer and a fluid within said chamber; and circuit means adapted to be actuated by the variation in volume of said elastomeric body due to the ambient pressure reaching the boiling pressure of said fluid.

References Cited in the file of this patent

UNITED STATES PATENTS

| | | |
|---|---|---|
| 2,683,103 | Smook et al. | July 6, 1954 |
| 2,713,266 | Smith et al. | July 19, 1955 |
| 2,713,795 | Herndon et al. | July 26, 1955 |
| 2,829,520 | Stanton | Apr. 8, 1958 |
| 2,880,127 | Spokes | Mar. 31, 1959 |
| 2,901,909 | Hobrough | Sept. 1, 1959 |
| 2,924,083 | Spase | Feb. 9, 1960 |
| 2,938,384 | Soreng et al. | May 31, 1960 |